April 3, 1956 W. H. DIEHL ET AL 2,740,375
APPARATUS FOR SPRAYING METAL ON ARTICLES
Filed Oct. 3, 1951 3 Sheets-Sheet 1

INVENTORS
W. H. DIEHL
G. A. FRANK

BY
W. C. Parnell
ATTORNEY

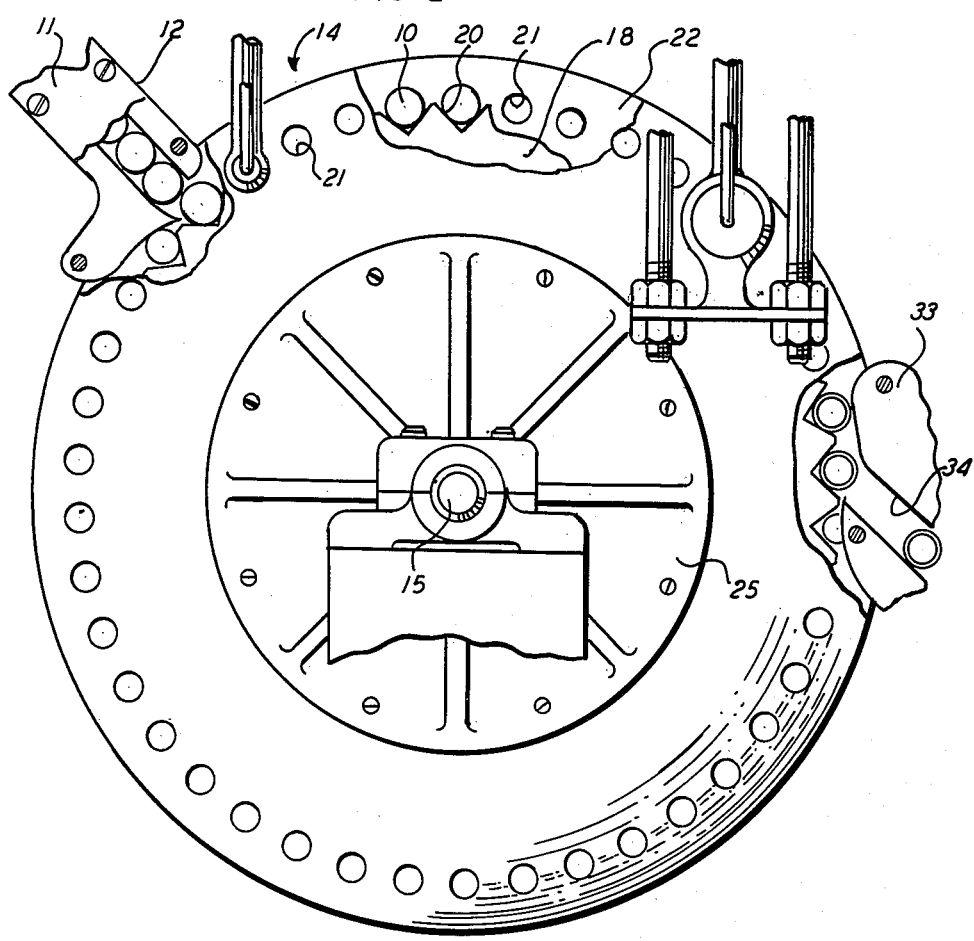

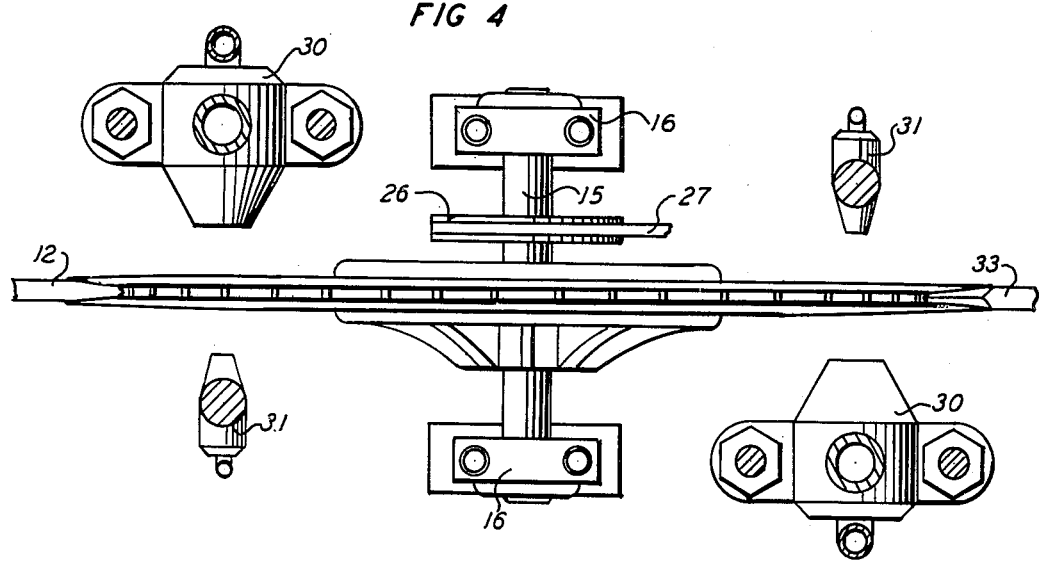
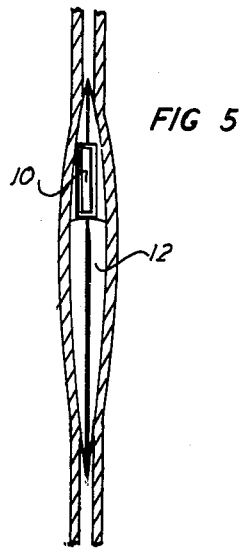
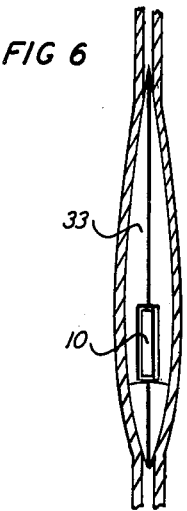
INVENTORS
W. H. DIEHL
G. A. FRANK

United States Patent Office 2,740,375
Patented Apr. 3, 1956

2,740,375

APPARATUS FOR SPRAYING METAL ON ARTICLES

Walter H. Diehl and Gerard A. Frank, Allentown, Pa., assignors to Western Electric Company, Incorporated, New York, N. Y., a corporation of New York Application October 3, 1951, Serial No. 249,514

5 Claims. (Cl. 118—301)

This invention relates to apparatus for coating articles and more particularly to apparatus for masking desired portions of like articles while the exposed portions thereof are metalized.

In the manufacture of certain types of variable resistors (varistors) for use in the communication arts, silicon carbide discs of a known diameter and thickness are to receive coatings of copper on portions of the opposing faces thereof. The coated portions of the articles, or silicon carbide discs, are to terminate short of the peripheries of the articles. It is, therefore, necessary during the application of the coating material to the articles, that the portions thereof which are not to receive the coating material, must be sealed against the path of the coating material.

It is the object of the present invention to provide an apparatus which is simple in structure, yet highly efficient in successively receiving articles and masking desired portions thereof while the exposed portions are being coated.

With this, and other objects in view, the invention comprises an apparatus for coating articles of a given thickness including members normally spaced from each other distances smaller than the thickness of the article, one of the members being apertured and one of the members being resilient to cause masking of the surfaces of the article excepting adjacent the aperture.

More specifically, the apparatus includes a wheel type mask rotatable about its axis and including a central member with equally spaced notches to accurately locate the articles successively relative to aligned apertures in resilient members which are normally spaced adjacent their peripheries, distances less than the thicknesses of the articles. A feeding unit capable of feeding the articles singly to the wheel, has an outlet end formed to extend between the resilient members to space them greater distances from each other so that they will readily receive the articles successively in the notches and subsequently close on the articles to seal all portions thereof which are not to be coated. An unloading unit has a similar effect on the wheel in that it spaces the resilient members and includes a chute to successively receive the coated articles. In the present embodiment of the invention, the coating units positioned to coat opposing surfaces of the articles, each include a spraying means on one side of the wheel to spray the coating material or liquid copper on the exposed parts of the articles and a nozzle to direct air to the opposite surface of each article while being coated tending to cool the article.

Other objects and advantages will be apparent from the following detailed description when considered in conjunction with the accompanying drawings wherein:

Fig. 2 is a front elevational view of the apparatus, portions thereof being broken away;

Fig. 3 is a top plan view of the central portion of the wheel;

Fig. 4 is a top plan view of the apparatus;

Fig. 5 is a fragmentary sectional view of the outlet end of the feeding unit; and Fig. 6 is a fragmentary sectional view illustrating the inlet end of the ejecting unit.

Figure 1:
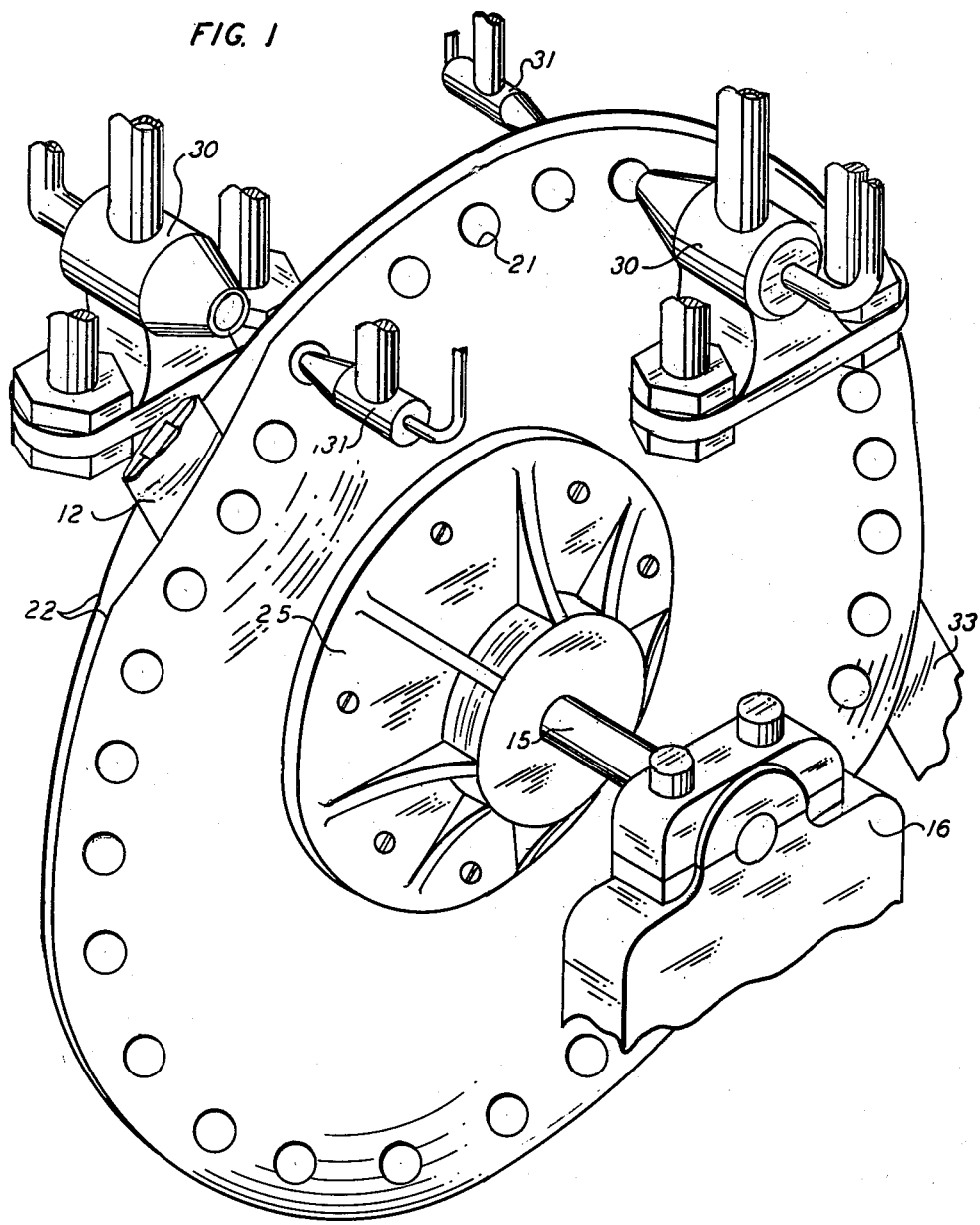
Fig. 1 is an isometric view of the apparatus.

Referring now to the drawings, the articles 10 to be coated are circular in contour and of like thicknesses, they being silicon carbide discs fed by suitable means successively through a chute 11 of a feeding unit 12. The articles are to be fed to a masking wheel 14 which is mounted on a shaft 15 journalled in suitable supports 16. The shaft 15 is driven by suitable means, not shown, in a clockwise direction and at a suitable speed sufficient for the coating operations to be performed on the opposing faces of the articles.

The wheel 14 is composed of a central member 18 of the contour shown particularly in Fig. 3. In this figure, it will be noted that the central portion of the member 18 is of a given thickness and that the sides of this portion taper inwardly toward each other as they approach the periphery thereof. The outermost portions of the central member 18 are smaller in thickness than the thicknesses of the articles 10. V-shaped notches or recesses 20 are formed in the periphery of the member 18 to receive the articles 10 and to accurately locate them with respect to each other, particularly with respect to aligned apertures 21 in resilient members 22. The resilient members 22 are secured to the sides of the central member 18 in such a manner that they will normally lie parallel with their respective tapering surfaces of the central member 18. In this manner, the outer peripheries of the resilient members 22 will extend toward each other and normally will be spaced from each other, distances less than the thicknesses of the articles 10. Mounting plates 25 complete the general structure of the wheel and with the addition of a pulley 26 mounted on the shaft 15 and connected to a power means, not shown, through a belt 27, the wheel 14 may be driven clockwise at any desired speed.

The outlet end of the feeding unit 12 is of the contour shown in Figs. 2 and 5 extending between the resilient members 22 to space them greater distances from each other so that the articles may move freely into the successive recesses 20.

The coating means includes spraying units 30 mounted at spaced positions on opposite sides of the wheel and capable of spraying coating material such as liquid copper in the path of the adjacent apertures 21 of the wheel. Associated with the spraying units 30 and mounted on opposite sides of the wheel therefrom, are cooling units 31 capable of directing jets of cool air toward the successive apertures of the parts being coated.

Beyond the final coating station, an ejecting unit 33 similar in contour to the feeding unit 12 is disposed. The ejecting unit has an entrance, illustrated in Figs. 2 and 6, positioned between the resilient members 22 of the wheel to move the resilient members away from each other, distances sufficient to free the coated articles and allow them to pass down a chute 34 in the unit to a receptacle, not shown.

Considering now the operation of the apparatus, it will be apparent that while the articles 10 are fed successfully down the feeding unit 12, during operation of the coating units with their cooling units, the articles 10 are fed successively to the wheel at a position where they will drop freely into the successive recesses 20 to be accurately located with respect to their apertures 21 prior to the closing of the resilient members on the articles. After the articles are received by the wheel and prior to their reaching the coating stations, the resilient members 22 have been freed to move into intimate engagement with the parts, completely sealing the portions other than those exposed by the apertures. The articles in this condition are moved successfully through the coating stations where their opposing surfaces are successively coated after which the completed or coated articles are allowed to roll free of the wheel through the chute 34 of the ejecting unit while the inner end of this unit moves the resilient members at this portion of the wheel away from each other.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for coating like articles of a given thickness comprising simultaneously movable members normally spaced from each other a distance smaller than the thickness of the articles, one of the members being apertured and one of the members being resilient to cause masking of surfaces of the articles excepting adjacent the apertures, means to direct a coating material in a given path, means to move the members relative to the path of coating material, a stationary feeding unit having its exit end extending between successively adjacent portions of the members to cause the portions of the resilient member to flex outwardly to receive the articles singly, and an element interposed between the members and movable therewith to successively locate the articles adjacent their apertures.

2. An apparatus for coating an article of a given thickness comprising a masking wheel driven in a given direction about its axis and including a central member with recesses in its periphery, and apertured resilient members spaced from each other by the central member distances less than the thicknesses of the articles and mounted with their apertures in alignment with recesses of the central member, and a stationary feeding unit to feed articles successively to the wheel including an exit end positioned between the resilient members adjacent the central member to flex successive portions of the resilient members outwardly away from each other to receive the articles therebetween singly in the recesses and free the resilient members to close on and grip the articles fed to the wheel.

3. An apparatus for coating an article of a given thickness comprising a masking wheel driven in a given direction about its axis and including a central member with outer surfaces tapering toward each other whereby the periphery of the member, which has spaced V-shaped recesses therein is thinner than the articles, resilient members mounted to normally engage their side surfaces of the central member so that their peripheries will extend beyond that of the central member and the apertures therein will be in alignment with the recesses, and a stationary feeding unit to feed articles successively to the wheel including an exit end positioned between the resilient members adjacent the central member to flex successive portions of the resilient members outwardly away from each other to cause them to receive the articles singly therebetween in the recesses and free the resilient members to close on and grip the articles fed to the wheel.

4. An apparatus for coating like articles of a given thickness comprising simultaneously movable members normally spaced from each other distances smaller than the thickness of the articles, means to move the members, one of the members being apertured and one of the members being resilient to cause firm gripping of the articles therebetween and masking of surfaces of the articles successively, excepting adjacent the apertures, means disposed between the members to position the articles adjacent the apertures, stationary feeding means extending between the members to flex successive portions of the resilient member outwardly to cause the members to receive the articles successively therebetween, and means to direct a coating material toward the exposed portion of the articles.

5. An apparatus for coating like articles of a given thickness comprising simultaneously movable members normally spaced from each other distances smaller than the thickness of the articles, means to move the members simultaneously, one of the members being apertured and one of the members being resilient to cause firm gripping of the articles therebetween and masking of surfaces of the articles excepting adjacent the apertures, means disposed between the members to position the articles adjacent the apertures, stationary feeding means extending between the members at one position to flex successive portions of the resilient members outwardly to cause the members to receive the articles therebetween, means to direct a coating material toward the exposed portion of the articles, and a stationary ejecting means extending between the members at another position to flex successive portions of the resilient member, outwardly to free the coated articles.

References Cited in the file of this patent

UNITED STATES PATENTS

| | | |
|---|---|---|
| 294,346 | Atkins | Mar. 4, 1884 |
| 2,189,783 | Eberhart | Feb. 13, 1940 |
| 2,369,671 | Greenberg et al. | Feb. 20, 1945 |
| 2,421,343 | Mageoch | May 27, 1947 |